US010680476B2

United States Patent
Li et al.

(10) Patent No.: US 10,680,476 B2
(45) Date of Patent: Jun. 9, 2020

(54) SYSTEMS AND METHODS FOR CONSTRUCTING PERMANENT MAGNET MOTORS HAVING INCREASED POWER DENSITY

(71) Applicants: Yong Li, Owasso, OK (US); James C. Clingman, Broken Arrow, OK (US)

(72) Inventors: Yong Li, Owasso, OK (US); James C. Clingman, Broken Arrow, OK (US)

(73) Assignee: Baker Hughes, A GE Company, LLC, Houston, TX (US)

( * ) Notice: Subject to any disclaimer, the term of this patent is extended or adjusted under 35 U.S.C. 154(b) by 79 days.

(21) Appl. No.: 15/879,544

(22) Filed: Jan. 25, 2018

(65) Prior Publication Data

US 2019/0229569 A1 Jul. 25, 2019

(51) Int. Cl.
| | | |
|---|---|---|
| *H02K 1/27* | (2006.01) | |
| *H02K 49/06* | (2006.01) | |
| *H02K 21/16* | (2006.01) | |
| *H02K 15/03* | (2006.01) | |
| *E21B 4/00* | (2006.01) | |
| *H02K 5/132* | (2006.01) | |
| *H02K 1/24* | (2006.01) | |

(52) U.S. Cl.
CPC ........... *H02K 1/278* (2013.01); *E21B 4/00* (2013.01); *H02K 5/132* (2013.01); *H02K 15/03* (2013.01); *H02K 21/16* (2013.01); *H02K 49/06* (2013.01); *H02K 1/246* (2013.01)

(58) Field of Classification Search
CPC ......... H02K 1/278; H02K 15/03; H02K 21/16
USPC .................................................. 310/156.01
See application file for complete search history.

(56) References Cited

U.S. PATENT DOCUMENTS 3,723,779 A * 3/1973 Gillum ............... H02K 41/0356
310/13
6,956,310 B1 * 10/2005 Knox ..................... H02K 5/132
310/87

(Continued)

FOREIGN PATENT DOCUMENTS

JP 2004120916 * 4/2004 ............... H02K 1/27

OTHER PUBLICATIONS

Schoppa, et al., "Soft magnetic powder composites and potential applications in modern electric machines and devices," IEEE Transactions on Magnetics 50, No. 4 (2014): 1-4.

(Continued)

*Primary Examiner* — Terrance L Kenerly
(74) *Attorney, Agent, or Firm* — Sprinkle IP Law Group (57) ABSTRACT

Systems and methods for constructing permanent magnet electric motors in which rotors have magnetically permeable end rings that are active for torque production. In one embodiment, a rotor section has a set of flat, generally annular laminations stacked on an inner rotor sleeve, with a pair of end rings positioned at opposing ends of the lamination stack to secure the stack. One or both of the end rings is made of a magnetically permeable and highly resistive material such as a soft magnetic composite, so that the end ring(s) actively produce torque during operation of the motor without significant increase in core loss at end rings. A set of permanent magnets are installed in or on the rotor core formed by the laminations. These magnets or other magnets may be positioned to axially overlap with the end rings and aid active torque production by the end rings.

19 Claims, 9 Drawing Sheets

(56) References Cited

U.S. PATENT DOCUMENTS

| | | | | |
|---|---|---|---|---|
| 7,687,949 B2* | 3/2010 | Lee | .................. | H02K 1/246 |
| | | | | 310/156.39 |
| 7,834,505 B2* | 11/2010 | Lee | .................. | H02K 1/276 |
| | | | | 310/156.53 |
| 9,624,938 B2* | 4/2017 | Forsberg | .................. | F04D 13/10 |
| 2003/0230948 A1* | 12/2003 | Murakami | ............. | H02K 1/276 |
| | | | | 310/156.53 |
| 2011/0012461 A1* | 1/2011 | Tomigashi | ............. | H02K 1/276 |
| | | | | 310/156.01 |
| 2014/0292114 A1* | 10/2014 | Bell | .................. | H02K 33/16 |
| | | | | 310/23 |
| 2016/0315527 A1* | 10/2016 | Clingman | ............. | H02K 1/276 |
| 2017/0001147 A1* | 1/2017 | Kulkarni | ............. | B01D 53/228 |
| 2017/0216778 A1* | 8/2017 | Lim | ................ | B01D 61/027 |

OTHER PUBLICATIONS

Svensson, et al., "Soft magnetic moldable composites: Properties and applications." Journal of Magnetism and Magnetic Materials 324, No. 18 (2012): 2717-2722.

Zhang, "Soft Magnetic Composites in Novel Designs of Electrical Traction Machines", KIT Scientific Pub. 5, PC-BDC 12.02 user's Manual, Speed software, Siemens, Jan. 10, 2017.

* cited by examiner (Prior art)
FIG. 1

SYSTEMS AND METHODS FOR CONSTRUCTING PERMANENT MAGNET MOTORS HAVING INCREASED POWER DENSITY

BACKGROUND

Field of the Invention

The invention relates generally to electric motors, and more particularly to systems and methods for constructing permanent magnet electric motors in which rotors have magnetically permeable end rings that are active for torque production.

Related Art

Oil and natural gas are commonly produced by drilling wells into oil reservoirs and then pumping the oil and gas out of the reservoirs through the wells. Often, it is the case that there is insufficient pressure in a well to force oil out of the well, so it may be necessary to use an artificial lift system in order to extract the oil from the reservoir. A typical artificial lift system employs an electric submersible pump (ESP) which is positioned in a producing zone of the well to pump the oil out of the well.

An ESP system includes a pump and a motor which is coupled to the pump, and which drives the pump. The ESP system may also include seals, gauge packages and various other components. Permanent magnet motors are becoming more popular for use in ESP systems due to their higher power density and efficiency, as compared to induction motors. From the perspective of deployment, high power density is preferred, and can make low-cost rigless ESP deployment and replacement feasible. While the higher power density of permanent magnet motors leads to greater power per unit volume, improvements in permanent magnet motor efficiency can keep the loss or temperature rise the same or even less than an induction motor that generates the same output power.

Because the ESP system is designed to fit within the borehole of a well, this system will be constrained in its diameter, with the outside diameter of a typical ESP motor (including the outer housing) typically being less than 5.62 inches. More commonly, the outer diameter of the ESP motor is 4.5 inches or less. Despite their small diameters, these motors may be tens of meters long, and may be designed to produce as much as 800 horsepower. This in turn requires that the shafts of the motors be big and strong enough to deliver this power to the ESP system's pump. In a motor having a 4.5 inch outer diameter, for example, the shaft may be about 1.2 inches in diameter. This leaves only about 1.40 inches between the shaft and the outer diameter of the housing (the housing thickness can be about 0.25 inches) to accommodate the motor's stator and rotor laminations, which limits the design and manufacturing of the motor.

The ESP motor may have multiple rotor sections within a long stator. For purposes of manufacturability, the rotor cannot be fixed to the shaft as in a short, surface permanent magnet motor. Instead, the rotor sections should be able to slide along the shaft for easy assembly. These rotor sections commonly have rotor cores that are constructed with stacks of thin, magnetically permeable laminations. Because the rotor laminations cannot be secured by copper rotor bars as in an induction motor, they must be secured by other means.

The laminations are normally secured by end rings that are positioned at opposite ends of the lamination stack that form the rotor core. In some cases, the end rings are secured by threaded rods or bolts which pass through the lamination stack and hold the end rings at opposing ends of the stack. Due to the limited space between the shaft and the outer diameter of the rotor, however, it may be difficult to secure the end rings in this manner. It is therefore common for the laminations to be mounted on a cylindrical tube or sleeve, with two end rings threaded onto the ends of the sleeve to secure the rotor laminations. With either of these types of rotor core construction, permanent magnets are positioned within cavities in the rotor core, or at the outer surface of the rotor core.

Conventionally, the end rings that secure the stack of laminations (whether they are threaded onto a sleeve or secured by bolts) are made of non-magnetically permeable aluminum bronze. Threaded end rings are usually around ¾" thick to maintain enough engagement length with the threads of the sleeve. Bolted end rings may have a similar thickness. When conventional end rings are used, the only active length for torque production is the rotor lamination stack—the aluminum bronze end rings do not contribute to torque production.

SUMMARY OF THE INVENTION

This disclosure is directed to systems and methods for constructing permanent magnet electric motors. In embodiments of these motors, a rotor core is formed by stacking a set of thin, annular laminations which are magnetically permeable. The stack of laminations is held together by a pair of end rings that are positioned at opposite ends of the lamination stack. The end rings are made of a magnetically permeable material with high resistivity, such as a soft magnetic composite. Permanent magnets are positioned in or on the rotor core and/or end rings. In the presence of rotating magnetic fields generated by a stator, both the lamination stack and the end rings are active in the production of torque.

One embodiment comprises a system having a downhole motor which includes a stator and a rotor. The stator has a bore therethrough. The rotor is mounted on a shaft, and the rotor and shaft are rotatably positioned within the stator bore. The stator has a plurality of stator windings which are energized to produce magnetic fields that drive the rotor to rotate within the stator bore. The rotor has one or more rotor sections, each of which includes a plurality of flat, generally annular laminations. Each of the laminations is magnetically permeable, and the laminations are stacked to form a magnetically permeable rotor core. Each rotor section also includes a pair of end rings positioned at opposing ends of the stacked laminations. At least one of the end rings (and preferably each) is made of a magnetically permeable material and actively produces torque during operation of the motor. A plurality of permanent magnets are installed in or on the rotor core.

In one embodiment, the end rings have a relative magnetic permeability of at least 500. The magnetically permeable material of the end rings may be a soft magnetic composite which has high resistivity to reduce the eddy current loss (as compared to a material such as carbon steel, which is magnetically permeable but has a high conductivity that will cause high eddy current loss). In one embodiment, the plurality of permanent magnets include a set of magnets that are mounted on the end rings. For example, a first set of magnets may be mounted on the rotor core and axially overlap only the rotor core, while a second set of magnets are mounted on the end rings and axially overlap only the end rings. In another embodiment, one or more of the permanent magnets may axially overlap both the rotor core and the end rings.

In one embodiment, the plurality of permanent magnets are installed in internal cavities within the rotor core. In other embodiments, the permanent magnets may be installed in recesses on an outward-facing surface of the rotor core.

In one embodiment, the rotor section includes a tubular inner sleeve on which the stacked plurality of laminations are mounted. An outward-facing surface of the inner sleeve may be threaded at each end. Each of the end rings may be threaded on an inward-facing surface, so that the end rings can be secured to the inner sleeve with the inward-facing threads of the end ring engaging the outward-facing threads on a corresponding end of the inner sleeve. In another embodiment, the rotor section has a plurality of threaded rods that extend through the stacked plurality of laminations. In this embodiment, a first end of each threaded rod is secured to a first one of the end rings and a second end of the threaded rod is secured to a second one of the end rings by a locking nut, thereby securing the stacked plurality of laminations together.

An alternative embodiment comprises an end ring for retaining a rotor lamination stack. The end ring is generally annular, and is made of a magnetically permeable and resistive material that actively produces torque in the presence of a stator magnetic field. The end ring is configured to be mounted in a rotor section, to thereby retain a set of rotor laminations in a stack that forms a rotor core. In one embodiment, the end ring includes a plurality of magnets that are mounted on the end ring. The magnetically permeable and resistive material of the end ring may have a relative magnetic permeability of at least 500, and may comprise soft magnetic composite. The end ring may have an inward-facing surface that is threaded and is capable of being threaded onto a rotor inner sleeve, thereby securing the end ring to the rotor inner sleeve.

Numerous other embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention. Further, the drawings may not be to scale, and may exaggerate one or more components in order to facilitate an understanding of the various features described herein.

DESCRIPTION OF EXEMPLARY EMBODIMENTS

Various embodiments of the invention are described below. It should be noted that these and any other embodiments described below are exemplary and are intended to be illustrative of the invention rather than limiting.

As described herein, various embodiments of the invention comprise systems and methods for increasing the efficiency and power density of electric motors. In these systems and methods, components of the motor's rotor are retained by magnetically permeable end rings which actively contribute to torque production in the motor.

One embodiment of the present invention is implemented in a permanent magnet ESP motor. The motor has a cylindrical stator having an outer diameter that is less than the diameter of a wellbore in which the ESP system will be installed. The stator has a bore therethrough, and a cylindrical rotor is installed in the bore. Windings of magnet wire are installed in the slots of a magnetically permeable laminated core of the stator, and permanent magnets are mounted on a magnetically permeable core of the rotor. The stator windings are energized to generate rotating magnetic fields in the bore, and the permanent magnets of the rotor interact with the generated rotating magnetic fields, driving the rotor to rotate within the bore.

The magnetically permeable core of the rotor is constructed by positioning a set (a "stack") of annular laminations on a tubular structure (a tube), and mounting an end ring on the tube at each end of the lamination stack to retain the laminations on the tube. The annular laminations are magnetically permeable, enabling the stack to actively produce torque in the motor. The end rings are formed using a magnetically permeable and resistive material, such as soft magnetic composite, which enables the end rings to actively produce torque as well. By contrast, conventional rotor structures use non-magnetically permeable material such as aluminum bronze, and consequently do not contribute to the torque production. This embodiment therefore produces more torque, has a higher power density, and has a greater efficiency than a conventional motor that is substantially identical except for the end rings.

Figure 1:
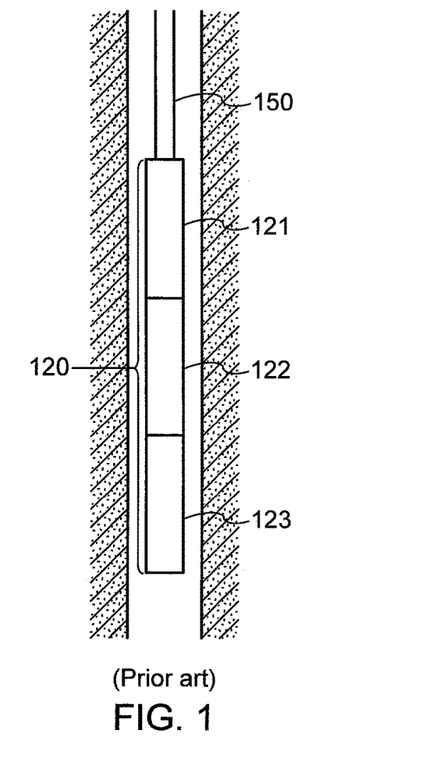
FIG. 1 is a diagram illustrating some of the primary components of an ESP system.

Embodiments of the invention may be implemented in various types of electric motors, such as those used in ESP systems. It should be noted that the embodiments of the invention are not limited to ESP motors. Referring to FIG. 1, a diagram illustrating the components of an ESP system in one embodiment. In this embodiment, an ESP system is implemented in a well for producing oil, gas or other fluids. An ESP system 120 is coupled to the end of tubing string 150, and the ESP system and tubing string are lowered into the wellbore to position the pump in a producing portion of the well. A drive system (not shown) at the surface of the well provides power to the ESP system 120 to drive the system's motor.

ESP system 120 includes a pump section 121, a seal section 122, and a motor section 123. ESP system 120 may include various other components which will not be described in detail here because they are well known in the art and are not important to a discussion of the invention. Motor section 123 is coupled by a shaft through seal section 122 to pump section 121. Motor section 123 rotates the shaft, thereby driving pump section 121, which pumps the oil or other fluid through the tubing string 150 and out of the well.

Figure 2:
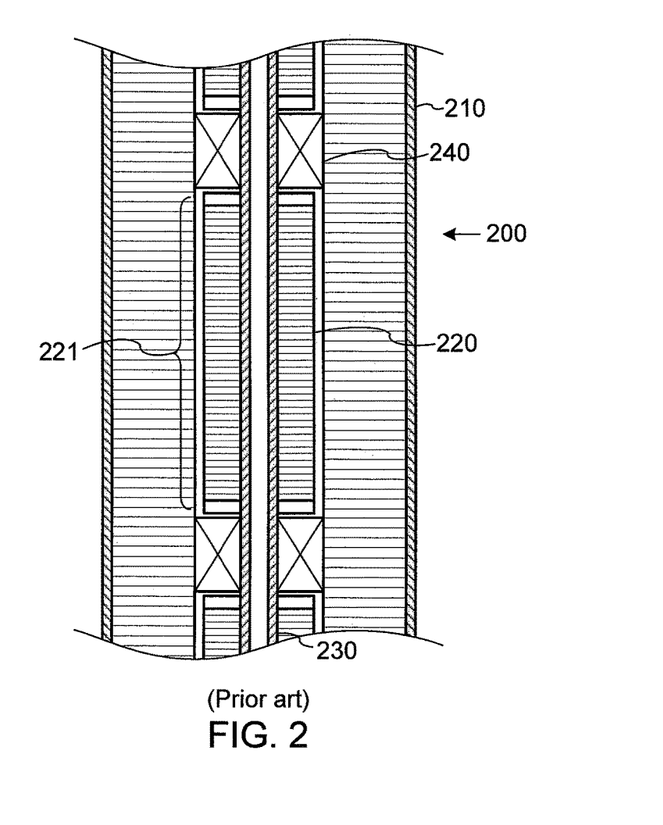
FIG. 2 is a diagram illustrating the structure of an exemplary motor suitable for use in an ESP system.

Referring to FIG. 2, a diagram illustrating the structure of an exemplary motor suitable for use in an ESP system is shown. As depicted in this figure, motor 200 has a stator 210 and a rotor 220. Stator 210 is generally cylindrical, with a coaxial bore that runs through it. Rotor 220 is coaxially positioned within the bore of stator 210. Rotor 220 is attached to a shaft 230 that is coaxial with the rotor and stator 210. In this example, rotor 220 includes multiple sections (e.g., 221), where bearings (e.g., 240) are positioned at the ends of each rotor section. The bearings 240 support shaft 230, and consequently rotor 220, within the bore of stator 210 and allow the rotor and shaft 230 to rotate within the stator. Thrust washers are positioned between the bearings and the end rings or end plates of the rotor sections.

Stator 210 is formed by stacking a set of thin plates or laminations. The laminations are generally annular in shape, so that when they are stacked together, they form a generally cylindrical shape, with a coaxial, cylindrical bore in the center. The diameter of the bore of the stator 210 may be referred to herein as the inner diameter of the stator. The stacked laminations are commonly pressed into a housing to form the stator assembly. It should be noted that the laminations are typically substantially the same, but need not be exactly identical. Similarly, the laminations need not be perfectly annular, but may instead be generally annular in shape (for example, the laminations may form a key or keyway that mates with a complementary structure of the housing to prevent the stacked laminations from rotating within the housing). The end laminations in the stack may be welded to the stator housing, or some other means may be used to secure the laminations within the stator housing.

The construction of rotor 220 is similar to that of stator 210, in that the rotor sections are formed by stacking corresponding sets of rotor laminations. The laminations are again generally annular, having an outer diameter that is slightly less than the inner diameter of stator 210, and an inner diameter that is substantially equal to the outer diameter of a tubular inner sleeve on which they are mounted. The laminations and inner sleeve may be keyed to prevent the laminations from rotating with respect to the sleeve. The inner sleeve is keyed onto shaft 230 to make the rotor-sleeve assembly rotate with the shaft.

Figure 3A:
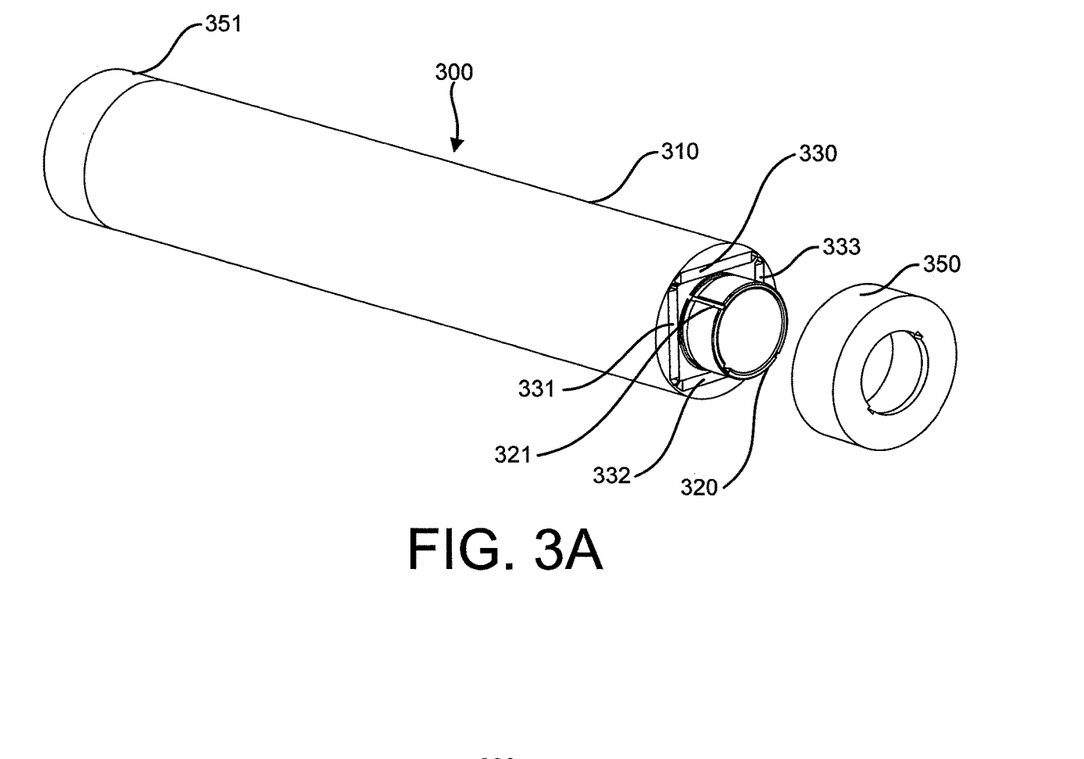
FIGS. 3A-3D are diagrams illustrating the structure of an exemplary rotor section having threaded end rings and internally positioned magnets in accordance with a first embodiment.
Figure 3B:
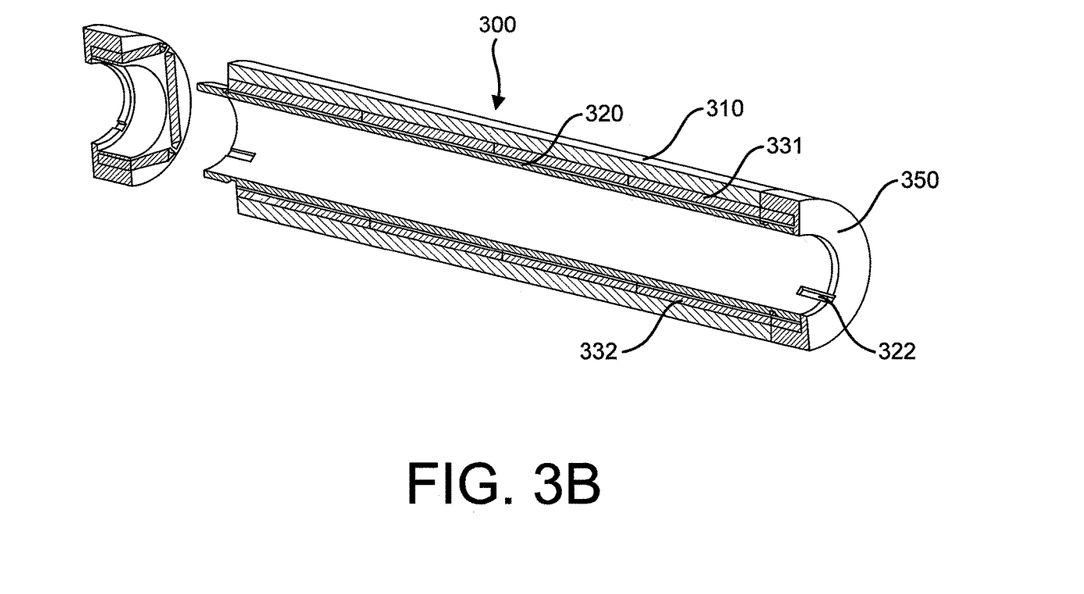
Figure 3C:
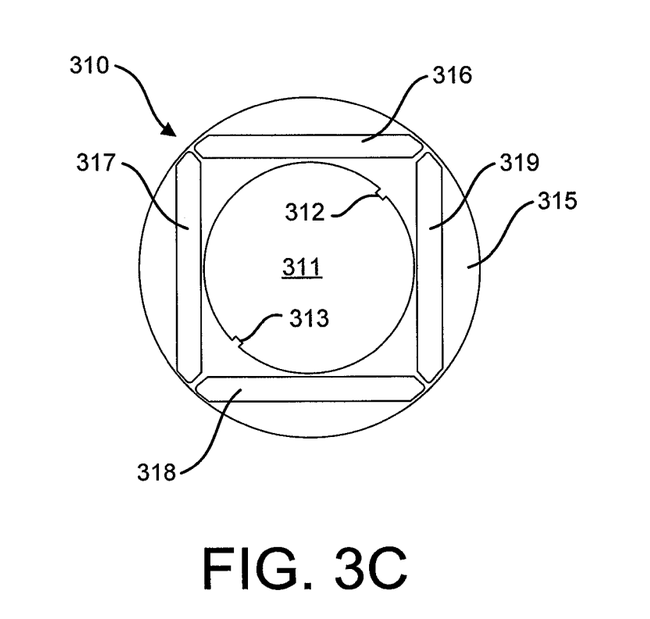
Figure 3D:
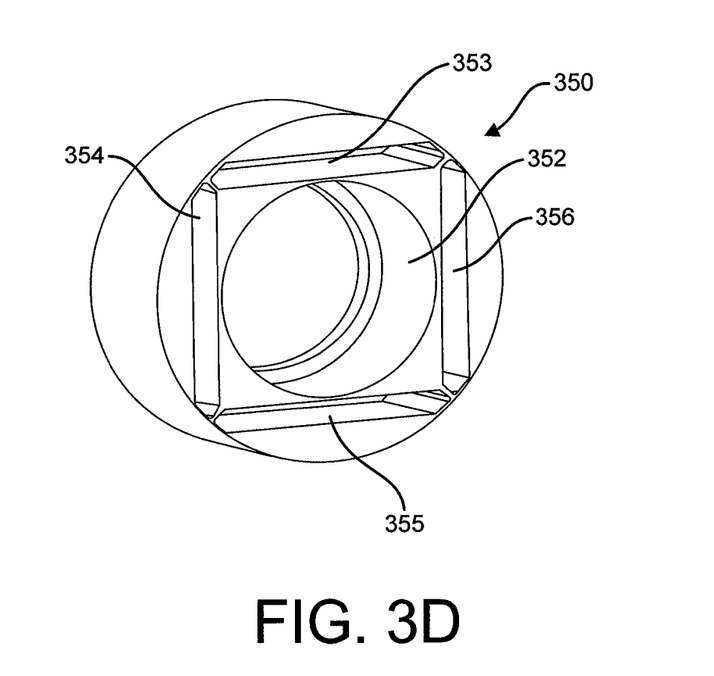

In a first embodiment of the invention, a permanent magnet motor of an ESP system has an interior permanent magnet (IPM) configuration. The motor has rotor sections that have magnetically permeable end rings threaded onto an inner sleeve on which a stack of rotor laminations are mounted. The laminations are shaped to form cavities in the rotor core, and the permanent magnets are positioned within the cavities. Referring to FIGS. 3A-3D, a first embodiment of the invention is shown. FIG. 3A is a perspective view of the rotor section with one end ring secured to the inner sleeve and one end ring removed from the inner sleeve. FIG. 3B is a cutaway view of the rotor section. FIG. 3C is a plan view of one of the rotor laminations. FIG. 3D is a perspective view of the end ring.

Referring to FIGS. 3A and 3B, rotor section 300 has a stack of rotor laminations 310 that are mounted on a tubular inner sleeve 320. The stack of laminations on the inner sleeve forms a magnetically permeable, generally cylindrical rotor core. The rotor core is constructed using thin laminations, rather than a solid core in order to reduce the eddy current loss in the core. In this embodiment, the rotor core has four cavities that extend axially through the interior of the core. Permanent magnets (e.g., 330-333) are positioned within these cavities. Each of the permanent magnets may have multiple segments. At each end of inner sleeve 320, the outward-facing surface of the sleeve is threaded to accept end rings 350, 351, which have complementary, inward-facing threads. When the end rings are threaded onto the inner sleeve of the rotor, the end rings secure the stack of laminations on the inner sleeve and secure the permanent magnets that are positioned within the cavities (flux barriers) in the rotor lamination stack.

"Axial", "axially", and the like are used herein to refer to directions that are essentially parallel to the axis of the rotor. The term "outward-facing" is used to refer to surfaces that face away from the rotor axis, while the term "inward-facing" is used to refer to surfaces that face toward the rotor axis.

Referring to FIG. 3C, one of the rotor laminations 310 is illustrated. Lamination 310 is a thin metal plate that is generally annular in shape. The lamination has a circular central opening 311 that allows it to be mounted on inner rotor sleeve 320. Protrusions or keys 312 and 313 that extend inward from the inner diameter of lamination 310 fit into a corresponding groove or notch 321 on the inner rotor sleeve when the lamination is mounted on the sleeve in order to prevent the lamination from rotating on the sleeve. The lamination has four openings or flux barriers (316-319) positioned between the inner diameter (314) and outer diameter (315) of the lamination. When the rotor laminations are stacked together, the openings of the laminations are aligned, forming the cavities in which the permanent magnets are positioned.

Referring to FIG. 3D, one of the end rings 350 is illustrated. End ring 350 is generally annular in shape. The end ring has threads 352 on its interior (inward-facing) surface which are complementary to threads 321 on the outward-facing surfaces at the ends of inner rotor sleeve 320. This allows the end rings to be threaded onto the inner sleeve, thereby securing laminations 321 and the end rings on the sleeve. The end rings are typically about ¾-inch thick so that there will be sufficient engagement between the threads of the end rings and the threads of the inner rotor sleeve. In addition to securing the laminations, the end rings also secure the permanent magnets within the cavities formed by the laminations.

End ring 350 has four recesses (353-356) formed between its inner and outer diameters. These recesses have essentially the same shape as the cavities formed by the laminations in the rotor core and allow the end rings to accommodate permanent magnets having the same configuration as the magnets in the rotor core (i.e., the cross-sections of the magnets normal to the rotor axis are the same for the magnets in the rotor core and the magnets in the end rings). The recesses are open toward the lamination stack—the opposite side of the end ring is closed and provides a flat surface that will slide smoothly against a thrust washer that is positioned between the rotor section and the adjacent bearing. The wall on the closed side should be strong enough to resist the axial force exerted by the permanent magnet, but should also be as thin as possible to reduce the flux leakage, for example, 40 mils.

It should be noted that, in the embodiment of FIGS. 3A-3D, the magnets in the rotor core do not extend out of the cavities formed by the laminations. Similarly, the magnets mounted on the end rings (positioned in the recesses of the end rings) do not extend out of the recesses. Put another way, the magnets in the rotor core do not overlap axially with the end rings, and the magnets in the end rings do not overlap axially with the rotor core. This allows the end rings to be rotated and threaded onto the inner rotor sleeve. After the end rings are threaded onto the inner rotor sleeve to secure the laminations and permanent magnets, a keyway 322 is cut into the inner surfaces of both the end of the sleeve and the end ring, allowing the sleeve and end ring to be keyed to the shaft so that torque can be transferred from the sleeve and end ring to the motor shaft.

The end rings are formed using a magnetically permeable and resistive material, such as a "Soft Magnetic Composite" (SMC). These SMC materials are manufactured by vendors such as Hoganas and Sintex. The SMC material is typically made of powder particles of a magnetically permeable material, bonded with a coating of an organic material, which produces high electrical resistivity. The coated powder is then pressed into a solid material using a die, and is then heat treated to anneal and cure the bond. This is process is commonly referred to as powder metallurgy. The high electrical resistivity in the SMC will significantly reduce the eddy current loss in the SMC material (similar to the purpose of using thin laminations, rather than a solid piece of magnetically permeable conductive material such as carbon steel, to form the rotor core).

Conventionally, the end rings are made of a material that is not magnetically permeable, such as aluminum bronze, so they are not active for the production of torque. By contrast, the magnetic permeability of the end rings in the embodiments of the present invention allows them to actively produce torque. Because the magnetic permeability of a material such as SMC is slightly less than that of the laminations, and because the permanent magnets do not extend entirely through the end rings, the amount of torque produced by the end rings will be slightly less than the same length of laminations in the rotor section. The use of end rings as disclosed herein may allow the rotor section to produce 10% to 12% more power/torque than a rotor section of conventional design (e.g., a rotor that is 12-15 inches long in total, with ¾ inch long end rings). With the same copper and friction loss, and slightly higher core loss, the improved power density of the present rotor sections will result in about 1% higher efficiency than conventional rotor sections.

The SMC material is made of powder particles of a magnetically permeable material such as pure iron, Fe—Ni, Fe—Si and Fe—Co alloy powder, bonded with a coating of an organic material, which produces high electrical resistivity. The coated powder is pressed into a solid material using a die in the shape of the desired part and is heat treated to anneal and cure the bond between particles. This is process is usually referred to as powder metallurgy. The high electrical resistivity in the SMC will significantly reduce the eddy current loss in the permeable material of the formed part. The relative magnetic permeability of the SMC material for the end ring is preferably greater than 500, and may be as high as 700. The resistivity of the SMC material is preferably no greater than $1 \times 10^{-4}$ Ohm-meter, but may be as high as $1 \times 10^{-3}$ Ohm-meter (carbon steel, by contrast, has resistivity of $1.43 \times 10^{-7}$ Ohm-meter). The magnetic permeability and core loss of the SMC material present a tradeoff in which the higher magnetic permeability is good for the magnetic performance of the motor and the generation of torque, but will lead to higher core loss in the end ring.

Figure 4A:
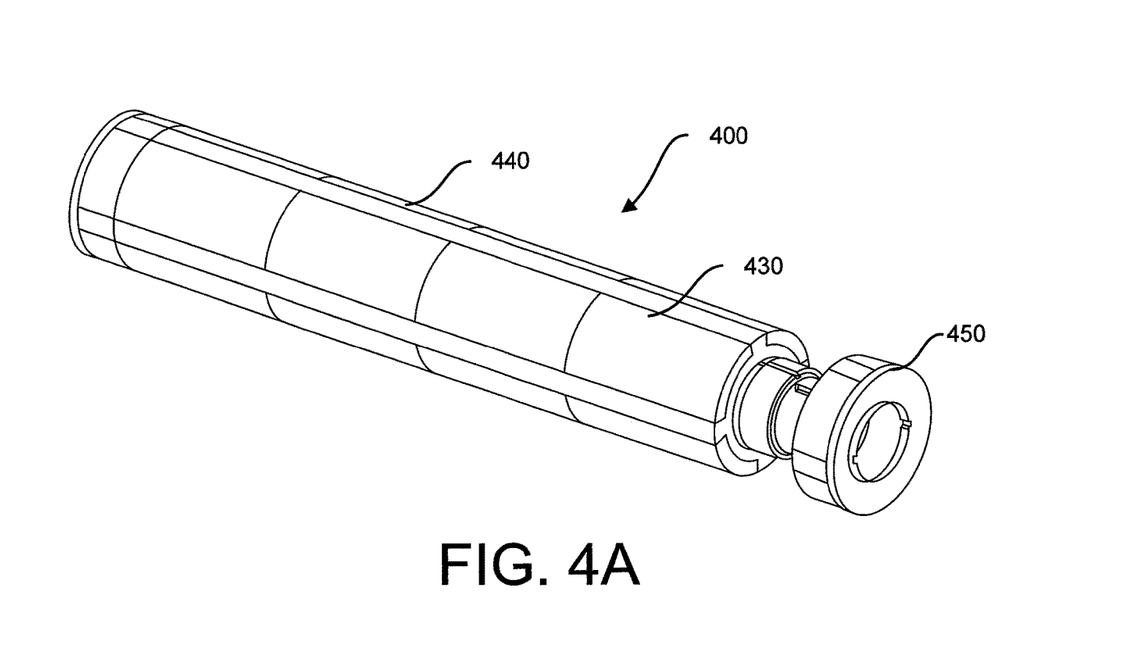
FIGS. 4A-4D are diagrams illustrating the structure of an exemplary rotor section having threaded end rings and surface permanent magnets in accordance with a second embodiment.
Figure 4B:
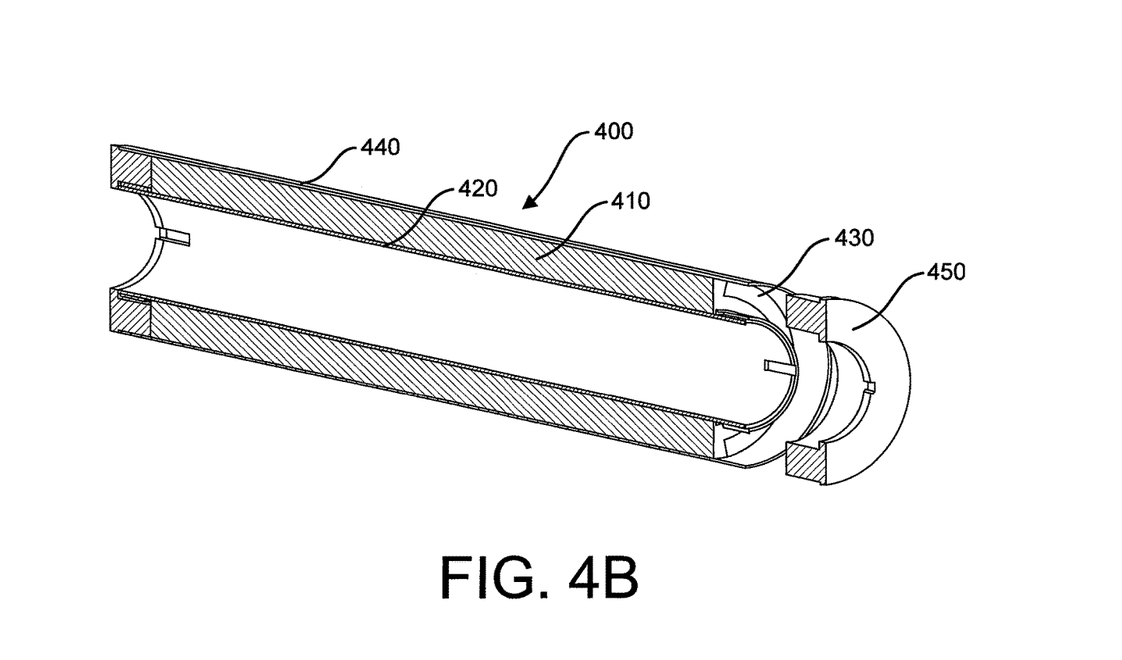
Figure 4C:
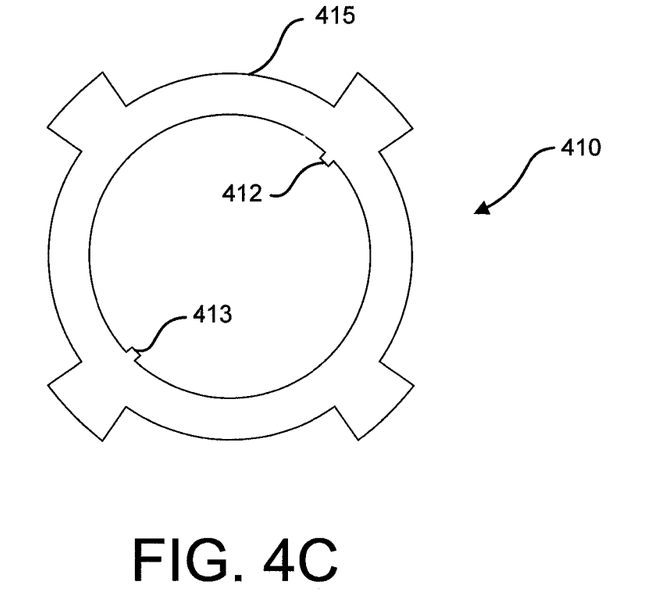
Figure 4D:
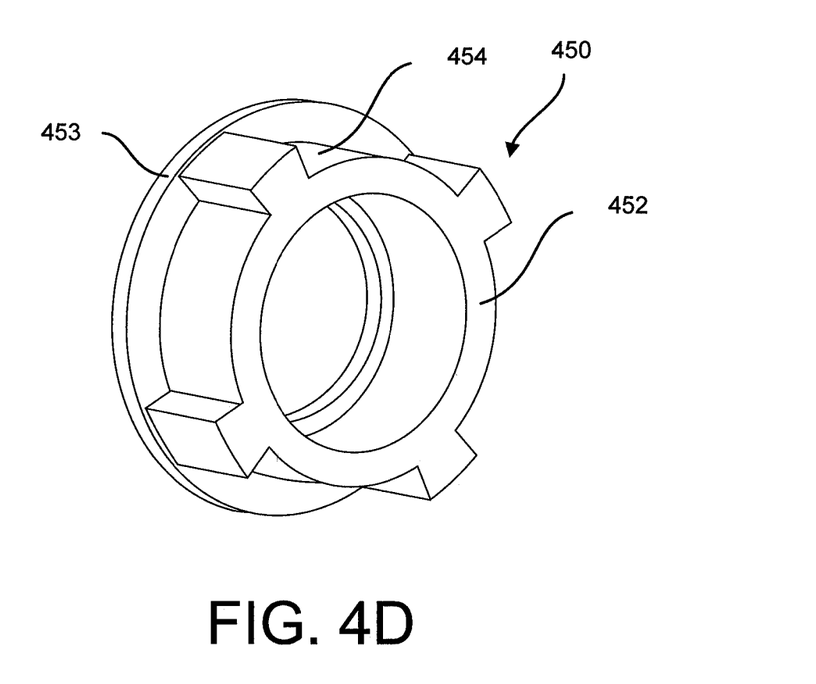

Referring to FIGS. 4A-4D, a permanent magnet rotor section in accordance with an alternative embodiment is illustrated. In this embodiment, the rotor section has a configuration that uses surface permanent magnets (an SPM configuration). The magnetically permeable end rings of the rotor section are again threaded onto an inner sleeve on which the stack of rotor laminations are mounted. In this embodiment, the laminations have recesses at their outer diameters which form corresponding recesses in the outer diameter (the outward-facing surface) of the rotor core, and the permanent magnets are positioned within the recesses. FIG. 4A is a perspective view of the rotor section with one end ring secured to the inner sleeve and one end ring removed. FIG. 4B is a cutaway view of the rotor section. FIG. 4C is a plan view of one of the rotor laminations. FIG. 4D is a perspective view of the end ring.

Referring to FIGS. 4A and 4B, rotor section 400 includes a rotor core that has corresponding recesses in its outer diameter. The recesses in the outward-facing surface of the rotor core accommodate surface permanent magnets (e.g., 430). An outer retaining sleeve 440 (not shown in FIG. 4A) is installed over the rotor core to retain the permanent magnets within the recesses. This outer retaining sleeve may be made, for example, of thin and nonmagnetic metallic material such as Inconel.

In one embodiment, the rotor core is formed by a set of thin, magnetically permeable rotor laminations 410 that are mounted in a stack on an inner sleeve 420. In this embodiment, the laminations have recesses (e.g., 415) in their outer diameters, so that the rotor core formed by the stacked laminations has corresponding recesses in its outer diameter. In an alternative embodiment, the rotor core may be a solid, machined component rather than a stack of laminations. In a surface permanent magnet motor, none of the material of the rotor core is between the magnets and the stator, so the primary benefit of the laminations—minimizing eddy current losses in the core—is reduced. The solid rotor core, on the other hand, can provide increased mechanical rigidity which is important in high speed applications.

FIG. 4C shows the shape of the laminations in more detail. Similar to the laminations in the embodiment of FIGS. 3A-3-D, each lamination 410 include protrusions 412, 413 on the inner diameter of the lamination which are configured to engage corresponding grooves on the outward-facing surface of the inner rotor sleeve 420 to prevent the laminations from rotating on the sleeve. In embodiments that have a solid rotor core, the cross-section of the core may have the same shape and features as the exemplary lamination shown in FIG. 4C.

Referring to FIG. 4D, the structure of the end rings (e.g., 450) in this embodiment is shown. like the end rings of the previous embodiment, end ring 450 is generally annular, with a threaded inward-facing surface 452 and an end wall 453 which provides a flat surface that will rotate against a thrust washer adjacent to the bearing. End ring 450 has a profile which is very similar to that of laminations 410, forming recesses (e.g., 454) which will accommodate surface permanent magnets. As depicted in FIG. 4A, rotor section 400 has magnets mounted on the end rings which are separate from the magnets mounted on the rotor core. This allows the end rings to be threaded onto the inner sleeve after the permanent magnets have been mounted in the recesses of the rotor core. Alternatively, the end rings may be threaded onto the inner sleeve, and the permanent magnets may be installed so that they bridge the interfaces between the lamination stack and the end rings. The outer retaining sleeve 440 is installed over the permanent magnets on both the rotor core and end rings in this embodiment.

As in the case of the embodiment of FIGS. 3A-3D, the end rings in the embodiment of FIGS. 4A-4D are formed with a magnetically permeable material such as an SMC material. Because the material of the end rings is magnetically permeable, they are active in the production of torque by the rotor section. The active production of torque by the end rings allows the rotor section to produce more power and torque than a conventional rotor section that has a comparable design, but uses non-magnetically permeable end rings. The end rings can serve this purpose in both laminated rotor core and solid rotor core embodiments. The end rings may also provide mechanical features such as axial retention of the magnets and potentially providing a mounting interface for the non-magnetic sleeve.

Figure 5A:
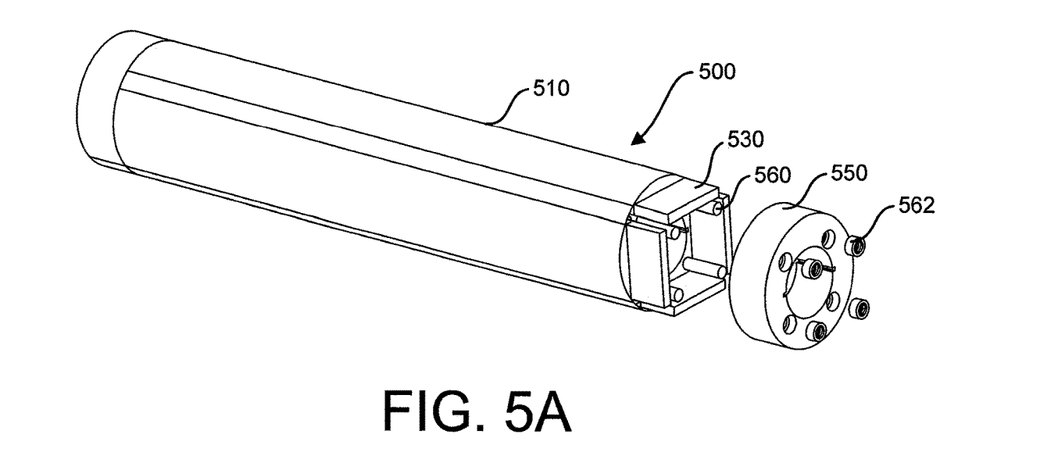
FIGS. 5A-5D are diagrams illustrating the structure of an exemplary rotor section having end rings secured by threaded bolts and internally positioned magnets in accordance with a third embodiment.
Figure 5B:
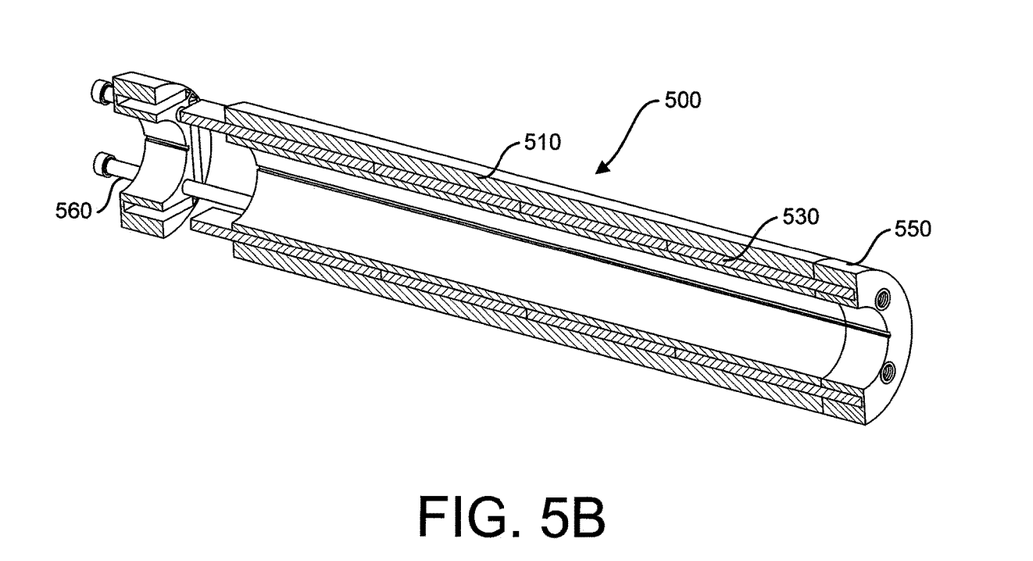
Figure 5C:
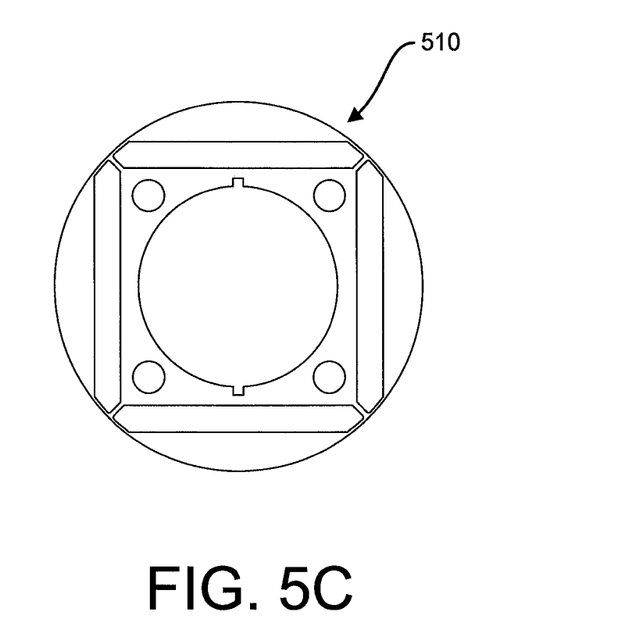
Figure 5D:
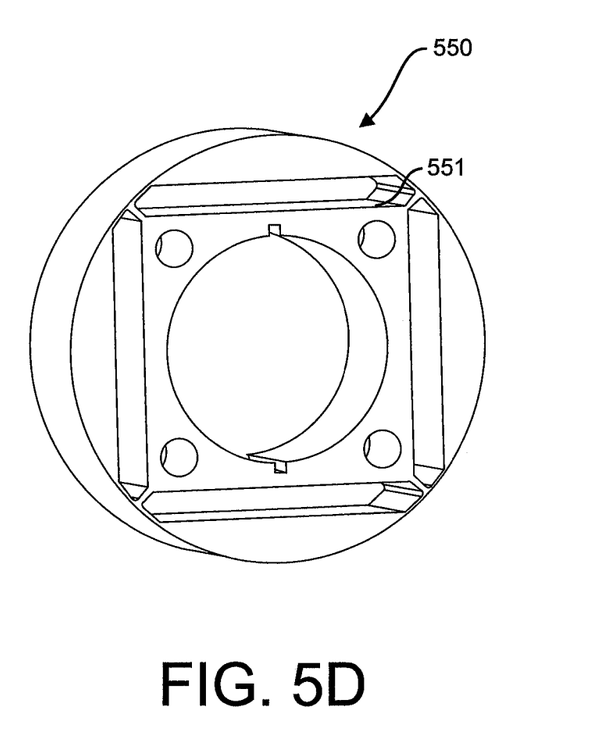

Referring to FIGS. 5A-5D, a permanent magnet rotor section in accordance with another alternative embodiment is illustrated. In this embodiment, the rotor section has an IPM configuration, where the magnetically permeable end rings of the rotor section are secured to each other using threaded rods that extend through the lamination stack. FIG. 5A is a perspective view of the rotor section with one end ring secured to the rotor laminations and one end ring removed. FIG. 5B is a cutaway view of the rotor section. FIG. 5C is a plan view of one of the rotor laminations. FIG. 5D is a perspective view of the end ring.

Referring to FIGS. 5A and 5B, it can be seen that the rotor section in this embodiment is similar in construction to the rotor section of FIGS. 3A-3D. The rotor section 500 has a set of thin, generally annular laminations (e.g., 510) that are mounted in a stack. The laminations have openings therethrough which form cavities when the laminations are stacked to form the rotor core. Permanent magnets (e.g., 530) are positioned within the cavities, and end rings (e.g., 550) are used to secure the lamination stack and magnets.

The primary difference between this embodiment and the embodiment of FIGS. 3A-3D is that the end rings are secured to the lamination stack in a different manner than previous embodiments. In this embodiment, the lamination stack and the end rings have holes therethrough to accommodate threaded rods (e.g., 560). The holes for the threaded rods in the laminations and end rings are shown in FIGS. 5C and 5D, respectively. The laminations are stacked together and the end rings positioned at the opposing ends of the lamination stack. Nuts (e.g., 562) are threaded onto the rods to secure the end rings at the opposite ends of the stack. Because the end rings do not have to be rotated as they are secured to the ends of the lamination stack, the permanent magnets may extend across the interfaces between the lamination stack and the end rings so that they occupy both the cavities within the lamination stack and the recesses/cavities (e.g., 551) within the end rings (although this is not necessary). Also, since the end rings are secured by the threaded bolts, it is not necessary to mount the laminations on a sleeve (although a sleeve could be used). In this embodiment, a pair of grooves or keyways are provided on the inner diameter of the laminations and end rings to allow the rotor section to be keyed to the shaft.

Figure 6A:
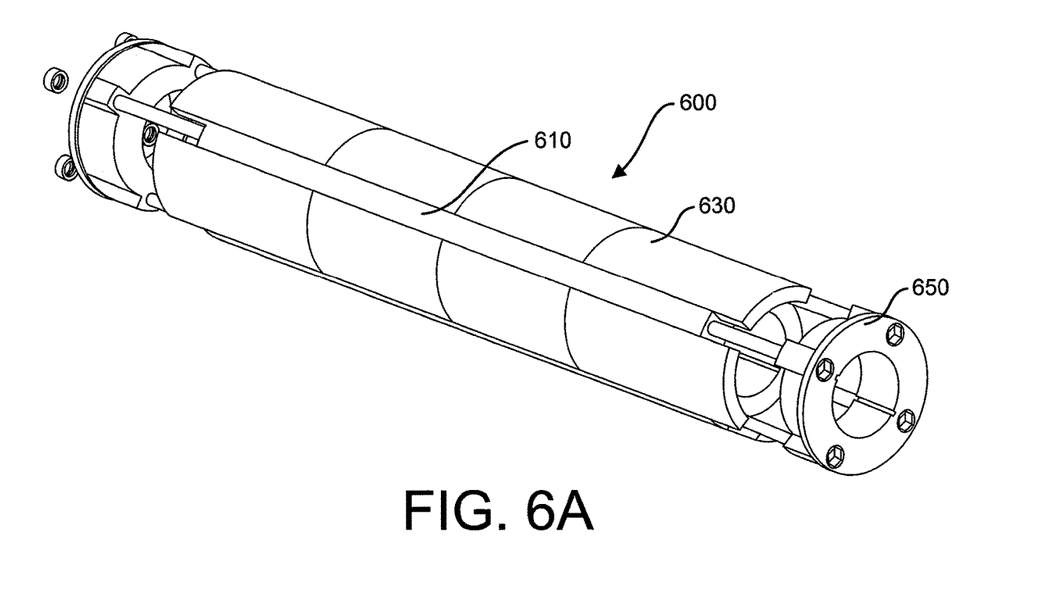
FIGS. 6A-6D are diagrams illustrating the structure of an exemplary rotor section having end rings secured by threaded bolts and surface permanent magnets in accordance with a fourth embodiment.
Figure 6B:
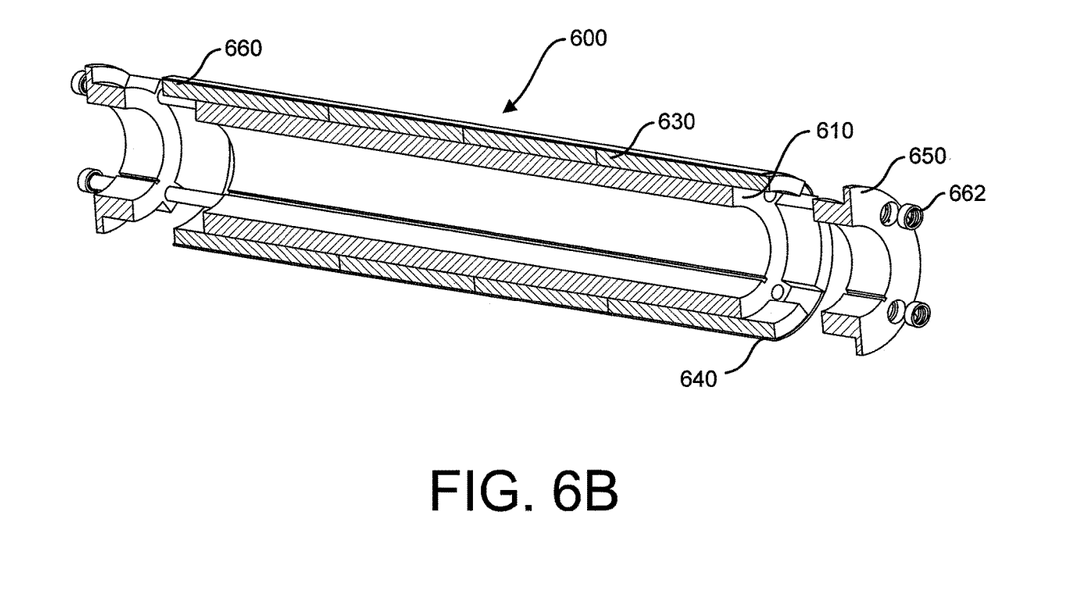
Figure 6C:
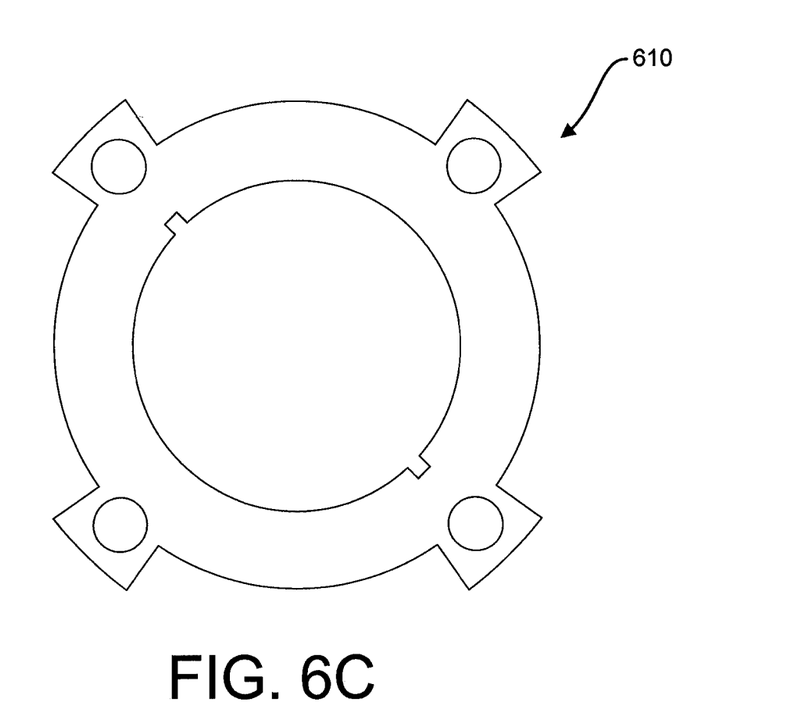
Figure 6D:
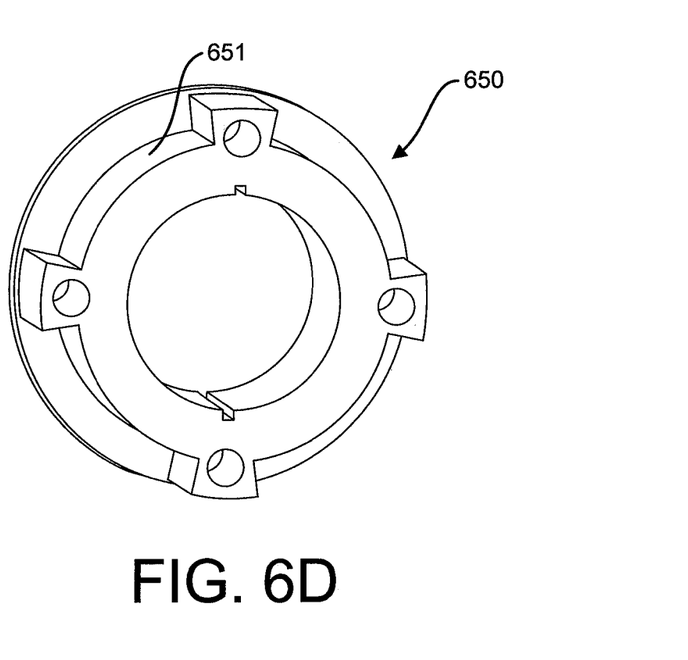

Referring to FIGS. 6A-6D, a permanent magnet rotor section in accordance with another alternative embodiment is illustrated. In this embodiment, the rotor section has an SPM configuration, where the magnetically permeable end rings of the rotor section are secured to each other using threaded rods that extend through the lamination stack. FIG. 6A is a perspective view of the rotor section with one end ring secured to the inner sleeve and one end ring removed. FIG. 6B is a cutaway view of the rotor section. FIG. 6C is a plan view of one of the rotor laminations. FIG. 6D is a perspective view of the end ring.

Referring to FIGS. 6A and 6B, it can be seen that the rotor section in this embodiment is similar in construction to the rotor section of FIGS. 4A-4D. The rotor section 600 has a rotor core that may either be a solid, machined component, or set of thin, generally annular laminations (e.g., 610) that are mounted in a stack. The laminations have recesses in their outer diameters which form recesses in the outer surface of the rotor core when the laminations are stacked together. In the case of the solid rotor core, the recesses are machined into the outer surface of the core. End rings (e.g., 650) are positioned at the ends of the rotor core to secure the stack of laminations and to provide mechanical features such as axial retention of the magnets and possibly providing a sleeve mounting interface. Permanent magnets (e.g., 630) are positioned within the recesses in the outer surface of the rotor core, and an outer sleeve is positioned over the rotor core and the permanent magnets to secure the magnets on the core.

The primary difference between this embodiment and the embodiment of FIGS. 4A-4D is that the end rings are secured to the lamination stack by threaded rods (e.g., 660) that extend through the rotor core and the end rings, with nuts (e.g., 662) threaded onto the rods to retain the end rings against the core. Because the end rings do not have to be rotated when they are secured to the ends of the lamination stack, the permanent magnets may extend across the interface between the lamination stack and the end rings (i.e., the same magnet may occupy both a recess in the rotor core and a recess 551 in the end ring). As with the embodiment of FIGS. 5A-5D, since the end rings are secured by the threaded bolts, it is not necessary to mount the laminations in a laminated-core design on a sleeve (although a sleeve could be used). Since no sleeve is used in this embodiment, a pair of grooves (keyways) are provided on the inner diameter of the rotor core and end rings to allow the rotor section to be keyed to the shaft.

It should be noted that there may be many alternative embodiments. For example, in the embodiments described above, the IPM rotors (e.g., the embodiments of FIGS. 3 and 5) only have one flux barrier, but alternative embodiments may use other constructions such as a Permanent Magnet assisted Synchronous Reluctance Motor (PMaSRM), which applies more than one flux barrier in the rotor. All of these embodiments will have improved power/torque density, as compared to conventional motors that use non-magnetically permeable end rings. The IPM rotors described above use interior rectangular magnets, but alternative embodiments may use other configurations, such as spoke type magnets. As for SPM rotors, the embodiments described above (e.g., the embodiments of FIGS. 4 and 6) are insert magnet/hybrid reluctance type, but other configurations such as radially magnetized surface magnets, breadloaf type magnets, etc. can also be used. Still other variations may be apparent to those of skill in the art upon reading this disclosure.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed herein.

What is claimed is:

1. An apparatus comprising:
    an end ring for retaining adapted to retain a rotor lamination stack, wherein the end ring is generally annular, wherein the end ring is made of a magnetically permeable material with high resistivity and actively produces torque in the presence of a stator magnetic field, wherein the end ring has a relative magnetic permeability of at least 500 and a resistivity of greater than $1.43 \times 10-7$ Ohm-meter;
    wherein the end ring is configured to be mounted in a rotor section, such that the end ring secures a plurality of rotor laminations in a stack that forms a rotor core; and
    further comprising a plurality of magnets that are mounted on the end ring.

2. The apparatus of claim 1, wherein the magnetically permeable material of the end ring comprises a soft magnetic composite, wherein the soft magnetic composite comprises particles of a magnetically permeable material which are bonded with a coating of an organic material to produce high electrical resistivity.

3. The apparatus of claim 1, wherein the end ring has an inward-facing surface that is threaded, wherein the threaded inward-facing surface is capable of being threaded onto a rotor inner sleeve, thereby securing the end ring to the rotor inner sleeve.

4. A system comprising:
    a downhole motor;
    wherein the motor includes
    a stator having a bore therethrough, and
    a rotor mounted on a shaft, wherein the rotor and shaft are rotatably positioned within the stator bore;
    wherein the stator has a plurality of stator windings and wherein the stator windings are energized to produce magnetic fields that drive the rotor to rotate within the stator bore;
    wherein the rotor comprises one or more rotor sections, and wherein each rotor section comprises
    a plurality of flat, generally annular laminations, wherein each of the laminations is magnetically permeable, and wherein the laminations are stacked to form a magnetically permeable rotor core,
    a pair of end rings positioned at opposing ends of the stacked laminations, wherein the end rings secure the stacked laminations on the rotor section, wherein at least one of the end rings is made of a magnetically permeable material with high resistivity and actively produces torque during operation of the motor, wherein the at least one of the end rings has a relative magnetic permeability of at least 500, and
    a plurality of permanent magnets installed in the rotor core and end rings;
    wherein the magnetically permeable material has a resistivity of greater than $1.43 \times 10-7$ Ohm-meter.

5. The system of claim 4, wherein the magnetically permeable material has a resistivity of between $1 \times 10-4$ Ohm-meter and $1 \times 10-3$ Ohm-meter.

6. A system comprising:
    a downhole motor;
    wherein the motor includes
    a stator having a bore therethrough, and
    a rotor mounted on a shaft, wherein the rotor and shaft are rotatably positioned within the stator bore;
    wherein the stator has a plurality of stator windings and wherein the stator windings are energized to produce magnetic fields that drive the rotor to rotate within the stator bore;
    wherein the rotor comprises one or more rotor sections, and wherein each rotor section comprises
    a plurality of flat, generally annular laminations, wherein each of the laminations is magnetically permeable, and wherein the laminations are stacked to form a magnetically permeable rotor core,
    a pair of end rings positioned at opposing ends of the stacked laminations, wherein the end rings secure the stacked laminations on the rotor section, wherein at least one of the end rings is made of a magnetically permeable material with high resistivity and actively produces torque during operation of the motor, wherein the at least one of the end rings has a relative magnetic permeability of at least 500, and
    a plurality of permanent magnets installed in the rotor core and end rings;
    wherein the magnetically permeable material and highly resistive comprises a soft magnetic composite; and
    wherein the soft magnetic composite comprises particles of a magnetically permeable material which are bonded with a coating of an organic material to produce high electrical resistivity.

7. The system of claim 6, wherein the coated particles are annealed and bonded into a solid material.

8. The system of claim 6, wherein the particles comprise either a metal or a metal alloy.

9. The system of claim 6, wherein the plurality of permanent magnets include a set of magnets that are mounted on the at least one of the end rings.

10. The system of claim 9, wherein the plurality of permanent magnets include; a first set of magnets that are mounted on the rotor core and axially overlap only the rotor core; and a second set of magnets that are mounted on the at least one of the end rings and axially overlap only the at least one of the end rings.

11. The system of claim 6, wherein one or more of the plurality of permanent magnets axially overlap both the rotor core and the at least one of the end rings.

12. The system of claim 6, further comprising a tubular inner sleeve on which the stacked plurality of laminations are mounted, wherein an outward-facing surface of the inner sleeve is threaded at each end, wherein each of the end rings is threaded on an inward-facing surface, and wherein each of the end rings is secured to the inner sleeve with the threads of the
    end ring engaging the threads on a corresponding one of the ends of the inner sleeve.

13. The system of claim 6, further comprising a plurality of threaded rods that extend through the stacked plurality of laminations, wherein a first end of each threaded rod is secured to a first one of the end rings and a second end of each threaded rod is secured to a second one of the end rings, thereby securing the stacked plurality of laminations together.

14. The system of claim 4, wherein the magnetically permeable material and highly resistive comprises a soft magnetic composite.

15. The system of claim 4, wherein the plurality of permanent magnets include a set of magnets that are mounted on the at least one of the end rings.

16. The system of claim 15, wherein the plurality of permanent magnets include; a first set of magnets that are mounted on the rotor core and axially overlap only the rotor core; and a second set of magnets that are mounted on the at least one of the end rings and axially overlap only the at least one of the end rings.

17. The system of claim 4, wherein one or more of the plurality of permanent magnets axially overlap both the rotor core and the at least one of the end rings.

18. The system of claim 4, further comprising a tubular inner sleeve on which the stacked plurality of laminations are mounted, wherein an outward-facing surface of the inner sleeve is threaded at each end, wherein each of the end rings is threaded on an inward-facing surface, and wherein each of the end rings is secured to the inner sleeve with the threads of the end ring engaging the threads on a corresponding one of the ends of the inner sleeve.

19. The system of claim 4, further comprising a plurality of threaded rods that extend through the stacked plurality of laminations, wherein a first end of each threaded rod is secured to a first one of the end rings and a second end of each threaded rod is secured to a second one of the end rings, thereby securing the stacked plurality of laminations together.

* * * * *